United States Patent
Yasuda et al.

(10) Patent No.: US 12,359,714 B2
(45) Date of Patent: Jul. 15, 2025

(54) TRANSFER-CASE ATTACHING DEVICE AND MULTI-PURPOSE VEHICLE INCLUDING THE TRANSFER-CASE ATTACHING DEVICE

(71) Applicant: Kubota Corporation, Osaka (JP)

(72) Inventors: Toshifumi Yasuda, Sakai (JP); Akihiro Takami, Sakai (JP)

(73) Assignee: Kubota Corporation, Osaka (JP)

( * ) Notice: Subject to any disclaimer, the term of this patent is extended or adjusted under 35 U.S.C. 154(b) by 226 days.

(21) Appl. No.: 17/834,244

(22) Filed: Jun. 7, 2022

(65) Prior Publication Data
US 2023/0102998 A1    Mar. 30, 2023

(30) Foreign Application Priority Data
Sep. 29, 2021 (JP) ................................. 2021-159373

(51) Int. Cl.
| | |
|---|---|
| *F16H 57/025* | (2012.01) |
| *F16H 57/032* | (2012.01) |
| *F16H 57/035* | (2012.01) |
| F16H 57/02 | (2012.01) |

(52) U.S. Cl.
CPC ......... *F16H 57/025* (2013.01); *F16H 57/032* (2013.01); *F16H 57/035* (2013.01); *F16H 2057/02052* (2013.01)

(58) Field of Classification Search
CPC .... F16H 57/025; F16H 57/032; F16H 57/035; F16H 2057/02026; F16H 2057/02039
See application file for complete search history.

(56) References Cited

U.S. PATENT DOCUMENTS

| | | | | |
|---|---|---|---|---|
| 5,501,122 | A | * | 3/1996 | Leicht .................... B60K 17/04 74/606 R |
| 6,338,688 | B1 | * | 1/2002 | Minami ................ F16H 57/035 474/146 |
| 2005/0239591 | A1 | * | 10/2005 | Schoenek ............. F16H 57/035 474/144 |
| 2010/0024757 | A1 | * | 2/2010 | Kashiwabara .......... F02N 15/00 123/179.25 |
| 2018/0180163 | A1 | * | 6/2018 | Schleif ................ F16H 57/0416 |
| 2018/0335111 | A1 | * | 11/2018 | Matsunaga ............... F16H 7/06 |
| 2021/0079995 | A1 | * | 3/2021 | Meis ....................... F03D 15/00 |

FOREIGN PATENT DOCUMENTS

| | | | | |
|---|---|---|---|---|
| CN | 107842601 | A | * 3/2018 | .......... F16H 57/025 |
| JP | 2014133489 | A | 7/2014 | |

OTHER PUBLICATIONS

English translation of CN-107842601-A (Year: 2018).*

* cited by examiner

*Primary Examiner* — Joseph Brown
(74) *Attorney, Agent, or Firm* — The Webb Law Firm

(57) ABSTRACT

A transfer-case attaching device includes a fixation mechanism. The fixation mechanism includes a connection bolt. The connection bolt includes a screw shaft portion, a large-diameter shaft portion, and a flange portion. The large-diameter shaft portion has a first contact surface at an end portion of the large-diameter shaft portion. The flange portion has a second contact surface at an end portion of the flange portion. A gap between the first contact surface and the second contact surface is set to a tightening-amount limited region, in which tightening of the connection bolt with respect to a transfer case is restricted to or below a predetermined tightening amount.

5 Claims, 5 Drawing Sheets

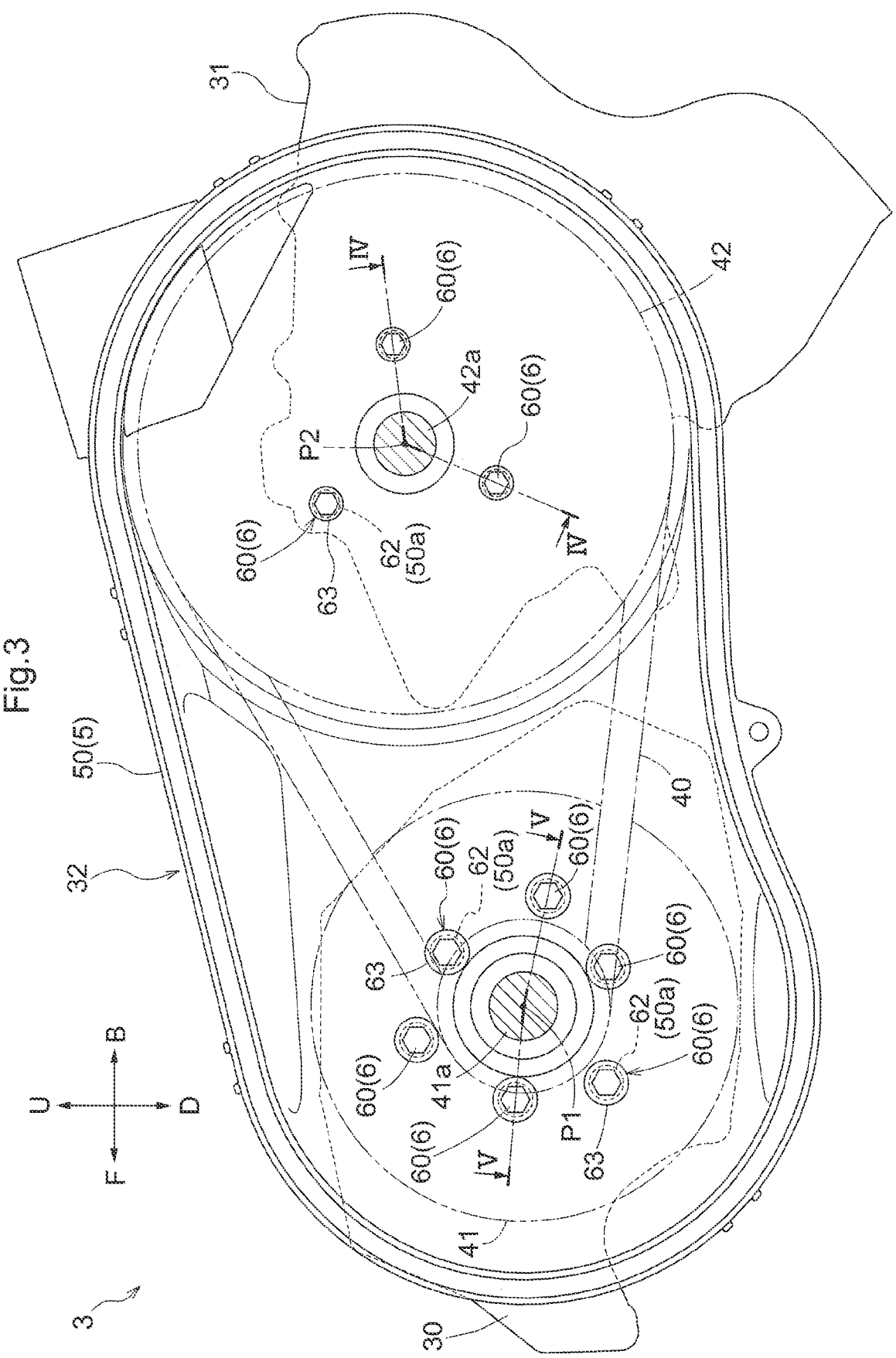

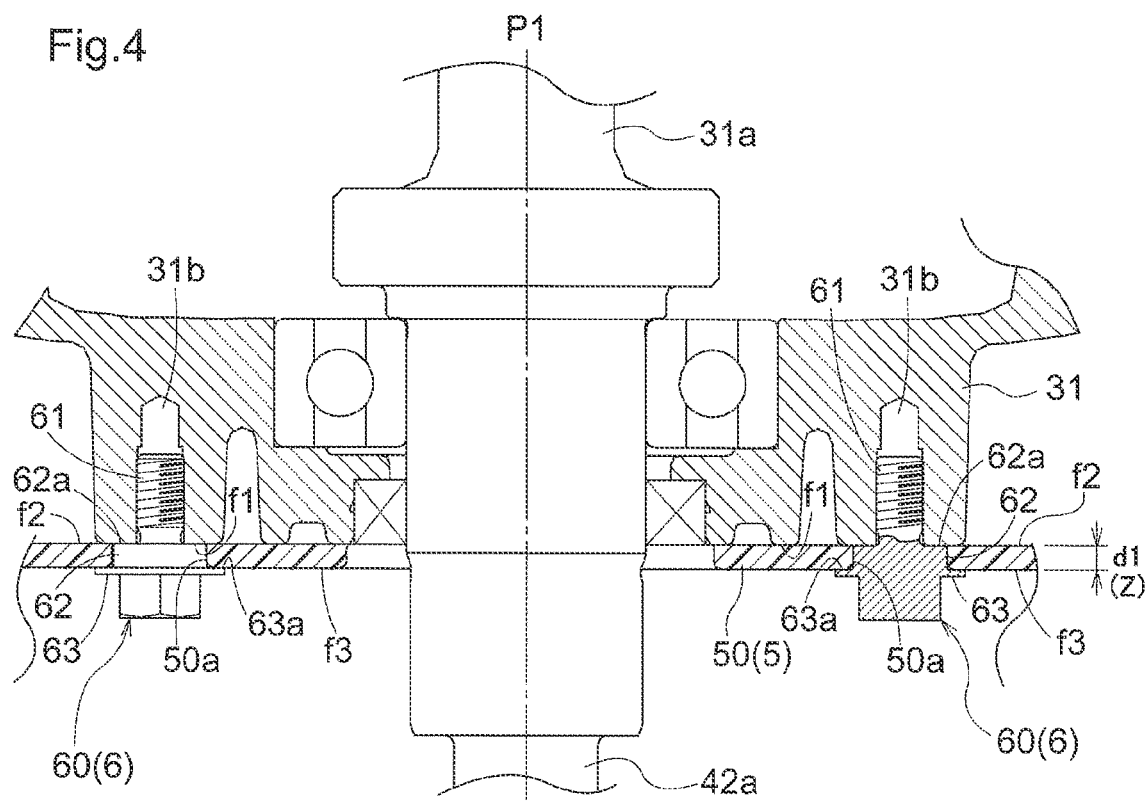
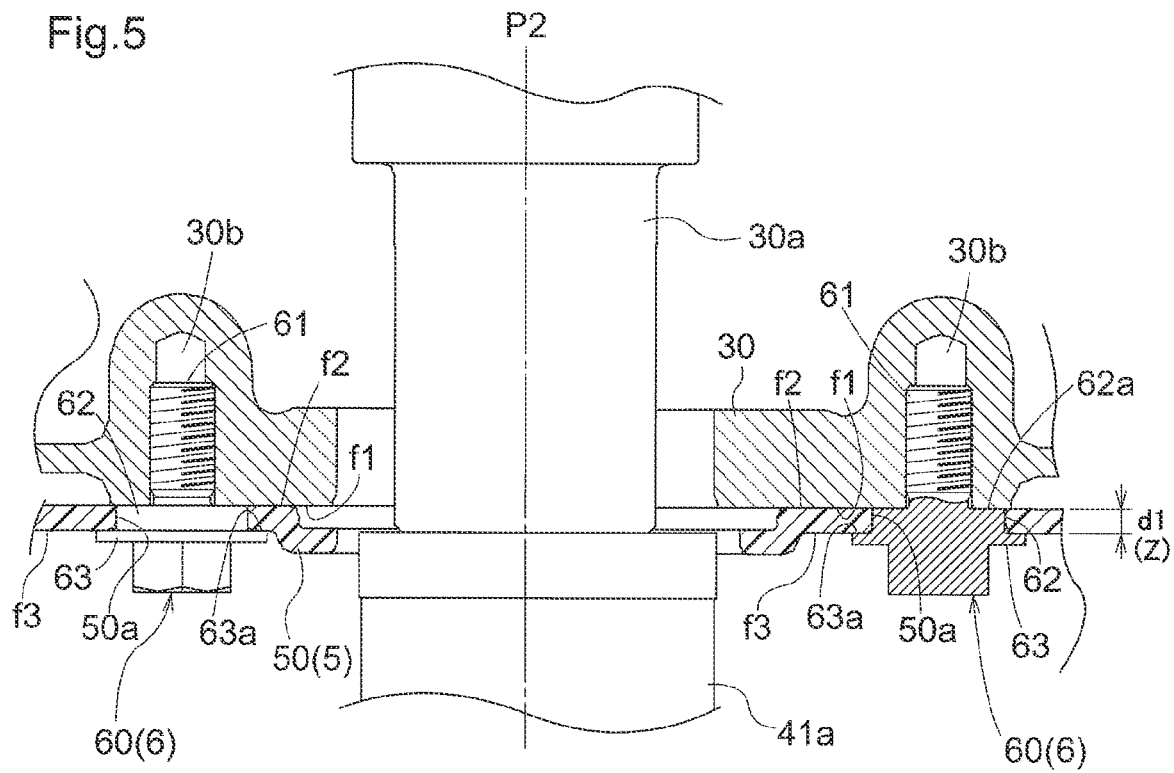

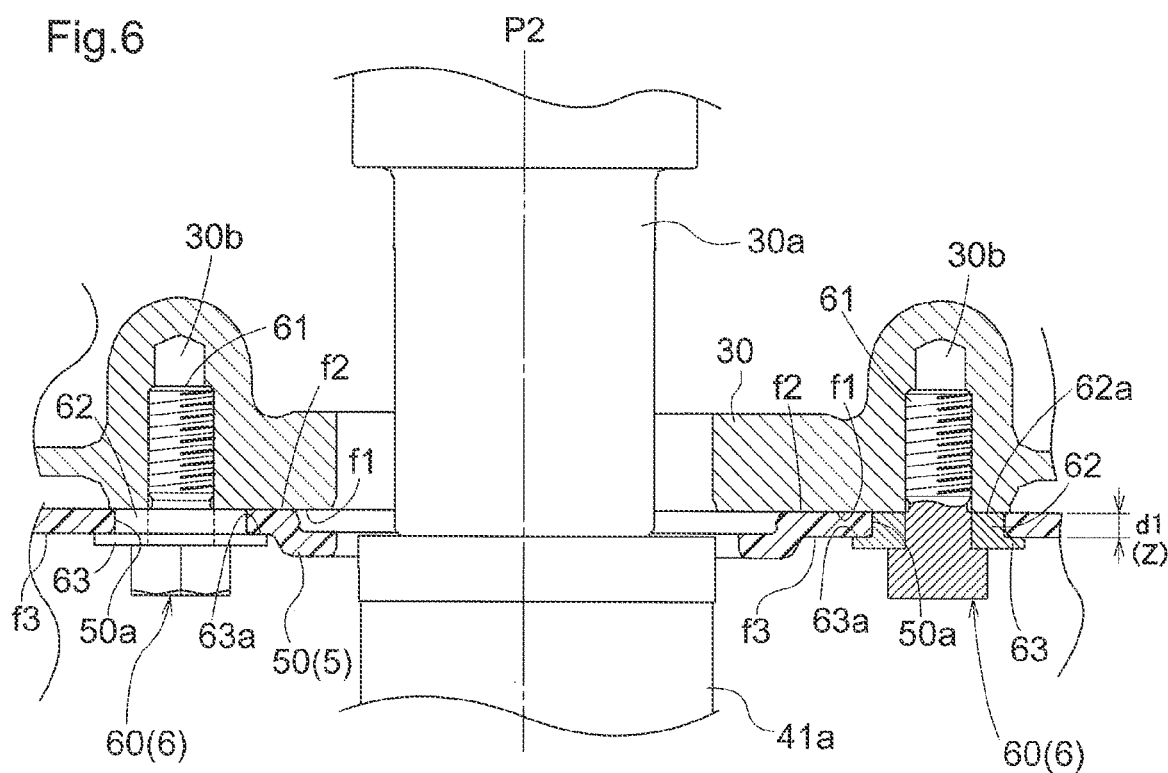

TRANSFER-CASE ATTACHING DEVICE AND MULTI-PURPOSE VEHICLE INCLUDING THE TRANSFER-CASE ATTACHING DEVICE

CROSS REFERENCE TO RELATED APPLICATION

This application claims priority to Japanese Patent Application No. 2021-159373 filed Sep. 29, 2021, the disclosure of which is hereby incorporated by reference in its entirety.

BACKGROUND OF THE INVENTION

Technical Field

The present invention relates to a transfer-case attaching device including a fixation mechanism for connecting and fixing a transfer case made of synthetic resin to an attaching target made of metal. The present invention also relates to a multi-purpose vehicle including the transfer-case attaching device.

Background Art

Patent Document 1 (JP2014-133489A) discloses a multi-purpose vehicle that is configured to transfer an output from an engine to a transmission via a belt transfer device.

The engine and the transmission are, needless to say, made of metal. When a belt transfer device is employed as a transmission device, there is such a tendency that a transfer case of the belt transfer device is made of synthetic resin in that synthetic resin is easy to process and facilitates reduction in weight.
Patent Document 1: JP2014-133489A In the multi-purpose vehicle recited in Patent Document 1, a belt transfer mechanism is disposed in the transfer case. The belt transfer mechanism includes an endless rotational-movement belt that is wound around a drive pulley and a driven pulley.

The transfer case is dividable into two halves, namely, an inner case and an outer case, in a direction along a plane intersecting the rotation axes of the drive pulley and the driven pulley, around which the endless rotational-movement belt is wound. The inner case is disposed on the vehicle body inner side, and the outer case is disposed on the vehicle body outer side. The inner case is connected and fixed to attaching targets such as the engine and the transmission. The outer case is detachable from the inner case.

A connection bolt is used as a fixation mechanism for connecting and fixing the inner case to the engine or the transmission. In this case, if the transfer case is made of synthetic resin and the connection bolt is fastened excessively, a crack may occur at the fastening portion between the inner case and the connection bolt, or the inner case may be deformed. A possible measure to avoid such an inconvenience is to cast a metal piece on and/or around the portion through which the connection bolt is passed. This measure, however, leaves room for improvement in that the measure may lead to an increase in cost.

SUMMARY OF THE INVENTION

In view of the foregoing, it is an object of the present invention to prevent the fastening portion of the transfer case from being cracked and/or deformed due to excessive fastening of a connection bolt used as a fixation mechanism.

A transfer-case attaching device according to the present invention includes: an attaching target that is made of metal and that has an attachment seat surface; a transfer case that is made of synthetic resin and that has an attached surface that is in contact with the attachment seat surface; and a fixation mechanism connecting and fixing the transfer case to the attaching target. The fixation mechanism includes: a screw hole formed in the attachment seat surface; a through hole formed in the attached surface; and a connection bolt that is screwed in the screw hole through the through hole and that is screwable out of the screw hole. The connection bolt includes: a screw shaft portion screwed in the screw hole; a large-diameter shaft portion that has a diameter larger than a diameter of the screw shaft portion and that is inserted in the through hole; and a flange portion having a diameter larger than a diameter of the through hole. The large-diameter shaft portion has a first contact surface at an end portion of the large-diameter shaft portion which end portion is located at a side of the attaching seat surface, the first contact surface being in contact with the attaching seat surface. The flange portion has a second contact surface at an end portion of the flange portion which end portion is located at the side of the attaching seat surface, the second contact surface being in contact with a surface of the transfer case which surface is located at a side opposite to the attached surface. A gap between the first contact surface and the second contact surface is set to a tightening-amount limited region in which tightening of the connection bolt with respect to the transfer case is restricted to or below a predetermined tightening amount.

According to this configuration, with the attached surface of the transfer case being in contact with the attachment seat surface, the transmission case is connected and fixed to the attaching target by fastening the connection bolt. The above configuration also prevents excessive fastening force of the connection bolt from acting on the synthetic-resin transfer case itself. As a result, the transfer case is less likely to be cracked or greatly deformed.

Specifically, the first contact surface, which is in contact with the attaching seat surface, is formed at an end portion of the large-diameter shaft portion which end portion is located at a side of the attaching seat surface. The second contact surface, which is in contact with a surface of the transfer case which surface is located at a side opposite to the attached surface, is formed at an end portion of the flange portion which end portion is located at the side of the attaching seat surface. The gap between the first contact surface and the second contact surface is set to a tightening-amount limited region in which tightening of the connection bolt is restricted to or below a predetermined tightening amount.

With this configuration, the second contact surface presses the transfer case toward the attaching seat surface until the first contact surface comes into contact with the attaching seat surface. After the first contact surface comes into contact with the attaching seat surface, the fastening force of the connection bolt does not act on the transfer case itself, but acts on the attaching seat surface from the first contact surface via the large-diameter shaft portion. This ensures that even if the fastening force of the connection bolt increases to a level higher than necessary after the first contact surface comes into contact with the attaching seat surface, the fastening force at a level higher than necessary is prevented from acting on the transfer case via the second contact surface. As a result, the transfer case is less likely to be cracked and/or deformed.

In the present invention, it is preferable that the attaching target is an engine or a transmission case, and the transfer case covers a belt-type continuously variable transmission mechanism.

Some attaching targets, such as engines and transmission cases, involve a high level of vibration. To such attaching targets, it is necessary to strongly fasten and fix a transfer case. In this case, the above configuration ensures that even if the connection bolt of the fixation mechanism is strongly screwed and fixed, the transfer case is less likely to be damaged by the strong tightening and fixation of the connection bolt.

In the present invention, it is preferable that the screw shaft portion, the large-diameter shaft portion, and the flange portion of the connection bolt are integral to each other.

According to this configuration, the screw shaft portion, the large-diameter shaft portion, and the flange portion are integral to each other. This facilitates inventory control in that the number of components is small.

In the present invention, it is preferable that the large-diameter shaft portion and the flange portion of the connection bolt are separate bodies separate from the screw shaft portion of the connection bolt.

According to this configuration, for the screw shaft portion of the connection bolt, a commercially available product having neither a large-diameter shaft portion nor a flange portion can be used. This facilitates the attempt to reduce cost.

In the present invention, it is preferable that a multi-purpose vehicle includes the above-described transfer-case attaching device.

According to this configuration, it is easy to obtain a multi-purpose vehicle in which the transfer case is less likely to be cracked and/or deformed.

BRIEF DESCRIPTION OF THE DRAWINGS

FIG. 3 is a side view of an inside of the belt-type continuously variable transmission.

FIG. 4 is a cross-sectional view taken along a plane indicated by line IV-IV in FIG. 3, and illustrates a fixation mechanism.

FIG. 5 is a cross-sectional view taken along a plane indicated by line V-V in FIG. 3, and illustrates the fixation mechanism.

FIG. 6 is a cross-sectional view of a fixation mechanism according to another embodiment.

DESCRIPTION OF THE INVENTION

With reference to the drawings, description will be made with regard to embodiments of a transfer-case attaching device according to the present invention and a multi-purpose vehicle including the transfer-case attaching device. In the following description regarding directions of a multi-purpose vehicle, the direction indicated by an arrow F in FIG. 1 will be referred to as "front direction of the vehicle body", the direction indicated by an arrow B will be referred to as "rear direction of the vehicle body", the direction indicated by an arrow U will be referred to as "upper direction of the vehicle body", the direction indicated by an arrow D will be referred to as "lower direction of the vehicle body", the direction indicated by an arrow R in FIG. 2 will be referred to as "right direction of the vehicle body", and the direction indicated by an arrow L will be referred to as "left direction of the vehicle body".

[Overall Configuration of Multi-Purpose Vehicle]

Figure 1:
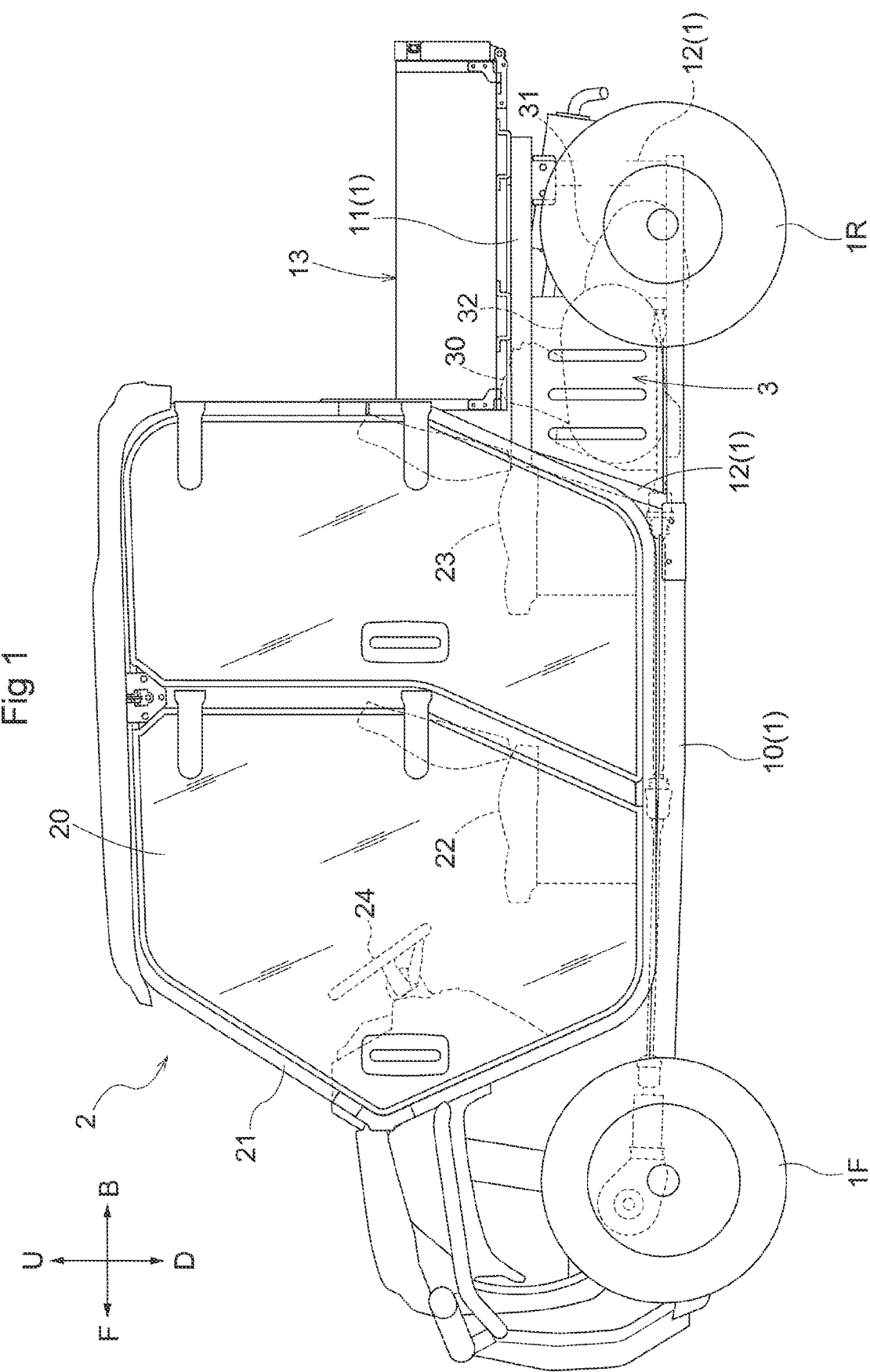
FIG. 1 is a side view of a multi-purpose vehicle.

The multi-purpose vehicle illustrated in FIG. 1 is used in multi-purpose applications such as cargo transportation and recreation.

The multi-purpose vehicle includes a vehicle body frame 1. The vehicle body frame 1 has a longitudinal length in the front-rear direction of the vehicle body, and serves as a skeleton of the vehicle body.

At lower portions of the vehicle body frame 1, a pair of left and right front wheels 1F and a pair of left and right rear wheels 1R are disposed. The pair of left and right front wheels 1F are steerable and drivable wheels, and the pair of left and right rear wheels 1R are drivable wheels.

A driver's section 2 is disposed at a center portion of the multi-purpose vehicle in the front-rear direction of the vehicle body. A cargo bed 13 is disposed behind the driver's section 2 in the vehicle body. A motive section 3 is disposed below the cargo bed 13 in the vehicle body.

The vehicle body frame 1 includes: a pair of left and right main frames 10, each of which has a longitudinal length in the front-rear direction between the front wheel 1F and the rear wheel 1R; and a pair of left and right cargo bed frames 11, which support the cargo bed 13 from below.

A front portion and a rear portion of each cargo bed frame 11 are connected to a corresponding one of support frames 12, 12, which extend in the upper direction from the main frames 10. Thus, the main frames 10 and the cargo bed frames 11 are integrally connected to each other. As a result, the vehicle body frame 1 has a three-dimensional frame structure.

The driver's section 2 includes a driving cabin 20, which is surrounded and protected by a protection frame 21. In the driver's cabin 20, the following are disposed. A driver's seat 22 is for an operator to be seated on. An auxiliary seat 23 is for a passenger to be seated on. A steering wheel 24 is for performing a steering operation. A speed-change lever (not illustrated) is for performing a speed-change operation. An accelerator pedal (not illustrated) is for changing the speed of the vehicle body.

The motive section 3 is disposed between the main frames 10, which are disposed below the motive section 3, and the cargo bed 13, which is disposed above the motive section 3. The motive section 3 includes elements including: a water-cooled gasoline engine 30 (hereinafter simply referred to as "engine 30"); a transmission case 31, in which a gear speed-change mechanism is installed; and a belt-type continuously variable transmission 32, in which a belt-type continuously variable transmission mechanism 4 (CVT) is installed in a transfer case 5. The transmission case 31 is provided behind the engine 30.

The engine 30 is installed in a horizontal posture with an axis line of a crankshaft 30a extending in the left-right direction of the vehicle body.

[Belt-Type Continuously Variable Transmission]

Figure 2:
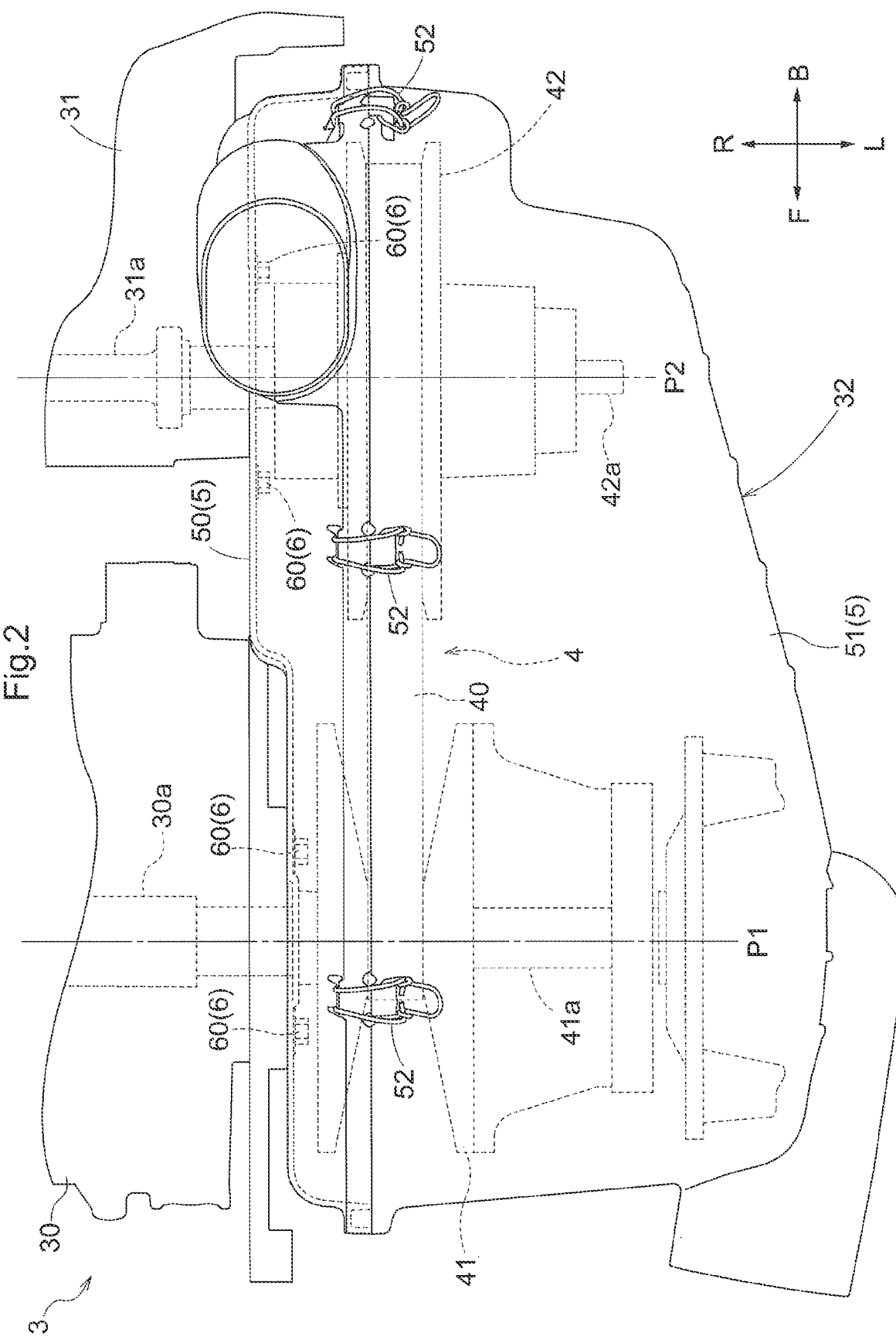
FIG. 2 is a plan view of a belt-type continuously variable transmission.

As illustrated in FIGS. 2 and 3, the belt-type continuously variable transmission 32 is disposed over an area covering a lateral side of the engine 30 and a lateral side of the transmission case 31.

The belt-type continuously variable transmission 32 includes the belt-type continuously variable transmission mechanism 4 and the transfer case 5. The belt-type continuously variable transmission mechanism 4 includes an endless rotational-movement belt 40, a drive pulley 41, and a driven pulley 42. The transfer case 5 accommodates the belt-type continuously variable transmission mechanism 4.

The drive pulley 41 is attached to a drive input shaft 41a, which is connected to the crankshaft 30a. The driven pulley 42 is attached to a speed-change output shaft 42a, which is connected to an input shaft 31a of the transmission case 31. The endless rotational-movement belt 40 is wound around the drive pulley 41 and the driven pulley 42. In order to make the winding diameter of the endless rotational-movement belt 40 changeable, each of the drive pulley 41 and the driven pulley 42 is a split pulley.

With this configuration, the power input from the engine 30 is changed in speed via the belt-type continuously variable transmission mechanism 4, and is transferred to the gear speed-change mechanism disposed in the transmission case 31. The output from the transmission case 31 is branched and transferred to the rear wheels 1R and the front wheels 1F.

The transfer case 5 is dividable into an inner case 50 and an outer case 51. The inner case 50 is disposed at an inner position in the vehicle body, and the outer case 51 is disposed at an outer position in the vehicle body.

Specifically, as illustrated in FIG. 2, the transfer case 5 is dividable into the inner case 50 and the outer case 51 along a plane intersecting both a rotation axis P1 of the drive pulley 41 and a rotation axis P2 of the driven pulley 42. The inner case 50 is disposed at the inner side of the divided portion in the vehicle body, that is, on the side closer to the attaching target such as the engine 30 and the transmission case 31. The outer case 51 is disposed at the side of the divided portion away from the attaching target.

The inner case 50 and the outer case 51 are connectable and disconnectable to and from each other with a plurality of snap locks serving as connection tools 52.

[Fixation Mechanism]

The transfer case 5 is attached to the vehicle body by fixing the inner case 50 to the engine 30 and the transmission case 31, which are attaching targets. The inner case 50 is fixed to an attaching target via a fixation mechanism 6.

The outer case 51 is connected to the inner case 50 via the connection tools 52. In this manner, the outer case 51 is attached to the vehicle body together with the inner case 50.

When the outer case 51 is detached at the time of work such as belt replacement, it is not necessary to detach the inner case 50 from the vehicle body; it is only necessary to detach the outer case 51 from the vehicle body by releasing the connection and fixation implemented by the connection tools 52.

The fixation mechanism 6 includes: screw holes 30b and 31b, which are formed in attaching seat surfaces f1 of the engine 30 and the transmission case 31, which are attaching targets; through holes 50a, each of which is formed in an attached surface f2 of the inner case 50, the attached surface f2 being opposed to each attaching seat surface f1; and connection bolts 60, which are screwable into and out of the respective screw holes 30b and 31b through the respective through holes 50a.

The fixation mechanisms 6 are part of the transfer-case attaching device for attaching the transfer case 5 to the attaching targets. In a case where the transfer case 5 is of a dividable type, the transfer-case attaching device includes the connection tools 52, which are for connecting the outer case 51, as well as including the fixation mechanisms 6.

[Connection Bolt]

As illustrated in FIGS. 2 to 5, the connection bolts 60 connect the inner case 50 to the attaching seat surface f1. The connection bolts 60 are disposed at a plurality of positions around the drive input shaft 41a and a plurality of positions around the speed-change output shaft 42a.

Each connection bolt 60 includes: a screw shaft portion 61, which is screwed in the screw hole 30b or 31b; a large-diameter shaft portion 62, which has a diameter larger than the diameter of the screw shaft portion 61 and which is inserted through the through hole 50a; and a flange portion 63, which has a diameter larger than the diameter of the through hole 50a. The screw shaft portion 61, the large-diameter shaft portion 62, and the flange portion 63 are integral to each other.

The large-diameter shaft portion 62 has a first contact surface 62a at an end portion of the large-diameter shaft portion 62. This end portion is located at a side of the attaching seat surface f1. The first contact surface 62a is in contact with the attaching seat surface f1. The flange portion 63 has a second contact surface 63a at an end portion of the flange portion 63. This end portion is located at the side of the attaching seat surface f1. The second contact surface 63a is in contact with a surface f3 of the transfer case 5. The surface f3 is located at a side opposite to the attached surface f2.

A gap d1 between the first contact surface 62a and the second contact surface 63a is set to a tightening-amount limited region Z. In the tightening-amount limited region Z, tightening of the connection bolt 60 with respect to the transfer case 5 is restricted to or below a predetermined tightening amount.

In this structure, when the screw shaft portion 61 of the connection bolt 60 is screwed into the screw hole 30b or 31b and turned in the fastening direction in which the screw shaft portion 61 is fastened, the second contact surface 63a of the flange portion 63 comes into contact with the surface f3, which is opposite to the attached surface f2 of the inner case 50. Until the first contact surface 62a of the large-diameter shaft portion 62 comes into contact with the attaching seat surface f1, the attached surface f2 of the inner case 50 is moved toward the attaching seat surface f1.

When the first contact surface 62a of the large-diameter shaft portion 62 comes into contact with the attaching seat surface f1 and reaches a tightening limit at which the screw shaft portion 61 cannot be further advanced into the screw hole 30b or 31b, the acting force of the second contact surface 63a of the flange portion 63 against the surface f3, which is opposite to the attached surface f2 of the inner case 50, stops changing and becomes constant.

With this configuration, it is possible to set the gap d1 between the first contact surface 62a and the second contact surface 63a to be equal to or slightly smaller than the thickness of a portion of the inner case 50 which portion is around the through hole 50a. By setting the gap d1 in this manner, the portion of the inner case 50 around the through hole 50a is supported in a state of not being excessively tightened.

The dimension slightly smaller than the thickness of the inner case 50 is within a range in which the inner case 50 is restorable by its elastic restoring force without cracking and/or a large degree of deformation.

Other Embodiments

Other embodiments will be described below. The following other embodiments may be combined insofar as no contradiction occurs. It is to be noted that the scope of the present invention will not be limited to the following other embodiments.

(1) In the above-described embodiment, the connection bolt 60 includes: the screw shaft portion 61, which is screwed in the screw hole 30b or 31b; the large-diameter shaft portion 62, which has a diameter larger than the diameter of the screw shaft portion 61 and which is inserted through the through hole 50a; and the flange portion 63, which has a diameter larger than the diameter of the through hole 50a. The screw shaft portion 61, the large-diameter shaft portion 62, and the flange portion 63 are integral to each other. This structure, however, is not intended in a limiting sense.

For example, as illustrated in FIG. 6, the connection bolt 60 may include: a screw shaft portion 61; and a large-diameter shaft portion 62 and a flange portion 63 that are separate bodies separate from the screw shaft portion 61.

This configuration ensures that a commercially available, simple headed bolt can be used as the screw shaft portion 61, which is other than the large-diameter shaft portion 62 and the flange portion 63 of the connection bolt 60. This facilitates the attempt to reduce the manufacturing cost.

The connection bolt 60 illustrated in FIG. 6 may be otherwise similar in configuration to the connection bolt 60 according to the above-described embodiment.

(2) The screw shaft portion 61, the large-diameter shaft portion 62, and the flange portion 63 of the connection bolt 60 may be separate bodies separate from each other. In this case, for example, the large-diameter shaft portion 62 can be replaced with a large-diameter shaft portion 62 having a different length in the axial direction, or the flange portion 63 can be replaced with a flange portion 63 having a different outer diameter. Accordingly, even if there are variations in the wall thickness of the inner case 50 and/or in the structure of the through hole 50a, a connection bolt 60 having a suitable structure is easily prepared.

The connection bolt 60 according to this another embodiment may be otherwise similar in configuration to the connection bolt 60 according to the above-described embodiment.

(3) In the connection bolt 60, one of the large-diameter shaft portion 62 and the flange portion 63 may be integral to the screw shaft portion 61, and the other one of the large-diameter shaft portion 62 and the flange portion 63 may be a separate body separate from the screw shaft portion 61. In this case, the number of components is reduced as compared with a case where all the components are separate bodies separate from each other.

The connection bolt 60 according to this another embodiment may be otherwise similar in configuration to the connection bolt 60 according to the above-described embodiment.

INDUSTRIAL APPLICABILITY

The transfer-case attaching device according to the embodiments of the present invention is applicable not only in the multi-purpose vehicle applications described above but also in various other work vehicle applications such as tractors and mowing machines.

The invention claimed is:

1. A transfer-case attaching device comprising:
an attaching target made of metal and having an attaching seat surface;
a transfer case made of synthetic resin and having an attached surface that is in contact with the attaching seat surface; and
a plurality of fixation mechanisms connecting and fixing the transfer case to the attaching target, wherein:
each of the fixation mechanisms comprises:
a screw hole formed in the attaching seat surface;
a through hole formed in the attached surface; and
a connection bolt that is screwed in the screw hole through the through hole and removable from the screw hole;
the connection bolt comprises:
a screw shaft portion screwed in the screw hole;
a large-diameter shaft portion that has a diameter larger than a diameter of the screw shaft portion and is inserted in the through hole; and
a flange portion having a diameter larger than a diameter of the through hole;
the large-diameter shaft portion has a first contact surface at an end portion of the large diameter shaft portion which end portion is located at a side of the attaching seat surface, the first contact surface in contact with the attaching seat surface;
the flange portion has a second contact surface at an end portion of the flange portion which end portion is located at the side of the attaching seat surface, the second contact surface in contact with a surface of the transfer case which surface is located at a side opposite to the attached surface;
a gap between the first contact surface and the second contact surface is set to a tightening amount limited region in which tightening of the connection bolt, with respect to the transfer case, is restricted to or below a predetermined tightening amount;
the fixation mechanism places the transfer case in direct contact with the attaching target;
the attaching seat surface includes a protrusion with the screw hole inside;
the protrusion defines a first end portion extending in a direction in which the screw hole extends, and the screw hole defines a second end portion between the first end portion and the side of the attaching seat surface;
the screw hole is covered by the protrusion at the first end portion;
a drive pulley is provided in the transfer case and configured to rotate to drive an endless rotational-movement belt wound around the drive pulley;
the drive pulley is configured to change a winding diameter of the endless rotational-movement belt; and
when the endless rotational-movement belt is closest to a rotation axis of the drive pulley, the endless rotational-movement belt overlaps at least one of the fixation mechanisms when viewed along the rotation axis.

2. The transfer-case attaching device according to claim 1, wherein:
the attaching target is an engine or a transmission case.

3. The transfer-case attaching device according to claim 1, wherein the screw shaft portion, the large-diameter shaft portion, and the flange portion of the connection bolt are integral to each other.

4. The transfer-case attaching device according to claim 1, wherein the large-diameter shaft portion and the flange portion of the connection bolt are separate bodies separate from the screw shaft portion of the connection bolt.

5. A multi-purpose vehicle comprising the transfer-case attaching device according to claim 1.

* * * * *